United States Patent [19]

Ogishima

[11] Patent Number: 4,539,627
[45] Date of Patent: Sep. 3, 1985

[54] HEADLIGHT DEVICE WITH TWO LIGHTS FOR MOTORCYCLES

[75] Inventor: Tetsuo Ogishima, Shiki, Japan

[73] Assignee: Honda Giken Kogyo K.K., Tokyo, Japan

[21] Appl. No.: 653,444

[22] Filed: Sep. 21, 1984

[30] Foreign Application Priority Data

Sep. 26, 1983 [JP] Japan .......................... 58-148603[U]

[51] Int. Cl.³ .............................................. B62J 17/02
[52] U.S. Cl. ........................................ 362/72; 362/61
[58] Field of Search ................... 362/72, 61, 369, 368, 362/375; 240/46.53, 61.8, 62.2, 62.3, 62.4, 62.61, 62.71

[56] References Cited

U.S. PATENT DOCUMENTS

| | | | |
|---|---|---|---|
| 2,168,939 | 8/1939 | Kracft | 362/72 |
| 3,099,400 | 7/1963 | Holmes | 362/72 |
| 3,922,031 | 11/1975 | Hugon | 362/72 |
| 3,939,339 | 2/1976 | Alphen | 362/72 |
| 4,213,171 | 7/1980 | Sassonannshausen | 362/72 |
| 4,249,232 | 2/1981 | Dick | 362/61 |
| 4,262,959 | 4/1981 | Saunders, IV | 362/72 |
| 4,420,803 | 12/1983 | Stabel et al. | 362/72 |
| 4,499,528 | 2/1985 | Hawlitzki | 362/61 |

Primary Examiner—Raymond A. Nelli
Attorney, Agent, or Firm—Arthur L. Lessler

[57] ABSTRACT

A headlight device with two lights for motorcycles is incorporated in an open space defined within the fairing. A single light casing is disposed in the open space of the fairing, within which a pair of light units are accommodated in juxaposition. Lens means is arranged at an open front face of the light casing. At least one of the light casing and the lens means has an outer peripheral surface thereof tightly fitted in the front opening of the fairing along the whole periphery thereof.

10 Claims, 14 Drawing Figures

HEADLIGHT DEVICE WITH TWO LIGHTS FOR MOTORCYCLES

BACKGROUND OF THE INVENTION

This invention relates to a headlight device with two lights for motorcycles, which is mounted in a front opening in a fairing covering a front portion of the motorcycle.

A headlight device with two lights for motorcycles is conventionally known, which comprises a pair of light assemblies each composed of a light bulb, a reflector disposed behind the light bulb, a light casing accommodating the light bulb and the reflector, and a lens fitted in a front face of the light casing, the light assemblies being mounted in a front opening in a fairing covering a front portion of the motorcycle. According to such headlight device, the light assemblies are pivotally supported in the front opening of the fairing in a manner permitting adjustment of their angular positions both in the vertical and horizontal directions to thereby adjust the position of the optical axis of each of the light assemblies. To avoid interference of the marginal edge of the front opening of the fairing with the light assemblies as well as between the light assemblies themselves during optical axis adjustment, the light assemblies have to be mounted in the front opening of the fairing so as to provide gaps between the light assemblies themselves and also between the light assemblies and the light casing. These gaps, however, cause degradation of the aerodynamic characteristics of the motorcycle, e.g. an increase in the air resistance that the motorcycle undergoes, etc.

A headlight device with two lights falling in the above-mentioned type is also known, in which each of the light units is accommodated within the respective independent light casing in a manner pivotable in the horizontal directions for adjustment of the horizontal angular position thereof, while each of the light casings is fastened, by bolts and nuts, to a stay extending from the front fork of the motorcycle in a manner pivotable in the vertical directions for adjustment of the vertical angular position thereof.

However, according to such headlight device, the bolts and nuts fastening each light casing to the stay is adapted to permit adjustment of the optical axis position in vertical directions, which necessitates carrying out the mounting of the light casing onto the stay and the optical axis adjustment at the same time. This simultaneous operation of mounting the light casing onto the motorcycle body and adjusting the optical axis position is very difficult to achieve and time-consuming.

SUMMARY OF THE INVENTION

It is an object of the invention to provide a headlight device with two lights for motorcycles, which can be tightly mounted in the front opening of the fairing without gaps between the two members, thereby improving the aerodynamic characteristics of the motorcycle.

It is a further object of the invention to provide a headlight device with two lights for motorcycles, which can be mounted onto the body of the motorcycle in a simple manner and permits precise adjustment of the optical axis position from outside and with ease.

The present invention provides a headlight device for a motorcycle, which is adapted to be mounted in an internal space in a fairing covering a front portion of the motorcycle, through a front opening formed in the fairing and facing the internal space. A pair of light units each having a light bulb and a reflector disposed behind the light bulb are accommodated in juxaposition within a single light casing disposed in the internal space of the fairing. Lens means is arranged at an open front face of the light casing. At least one of the light casing and the lens means has an outer peripheral surface thereof tightly fitted in the front opening of the fairing along the whole periphery thereof.

The above and other objects, features, and advantages of the invention will be more apparent from the ensuing detailed description taken in conjunction with the accompanying drawings.

BRIEF DESCRIPTION OF THE DRAWINGS

FIG. 1 (*b*) is a schematic front view of the conventional headlight device;

FIG. 1 (*c*) is a schematic left side view of the conventional headlight device;

FIG. 2 (*b*) is a schematic front view of the same device;

FIG. 2 (*c*) is a schematic left side view of the same device;

DETAILED DESCRIPTION

Figure 1:
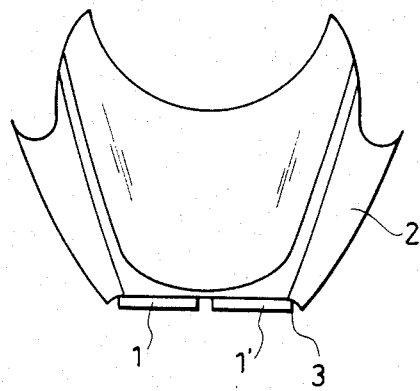
FIG. 1 (*a*) is a schematic top plan view of a conventional headlight device with two lights incorporated in the fairing of a motorcycle.
Figure 1:
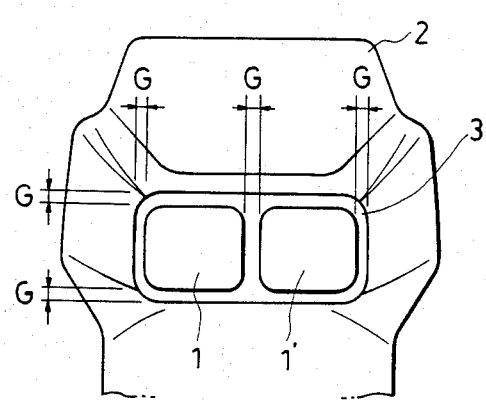
Figure 1:
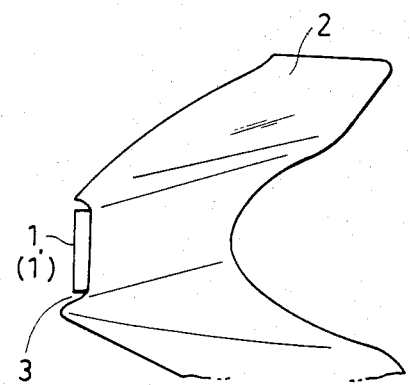

Referring to FIG. 1 (*a*) through FIG. 1 (*c*), a conventional headlight device with two lights is illustrated. Two separate headlight assemblies 1, 1' are mounted in a front opening 3 formed in a fairing 2 with gaps G between the headlight assemblies themselves and between the headlight assemblies and the marginal edge of the front opening 3. While the headlight assemblies 1, 1' are thus being mounted, they are subjected to locating for adjustment of their angular positions in the vertical directions as well as in the horizontal directions so as to obtain desired light distribution patterns, utilizing the presence of the gaps G, before the mounting of the headlight assemblies into the fairing 2 is completed. The angular displacement of the headlight assemblies 1, 1' is allowed by the presence of the gaps G.

However, according to the conventional headlight device, the presence of the gaps G between the headlight assemblies 1, 1' and between the same and the fairing 2 causes the aforementioned disadvantages.

The present invention will now be described in detail with reference to FIGS. 2 through 10.

Figure 2:
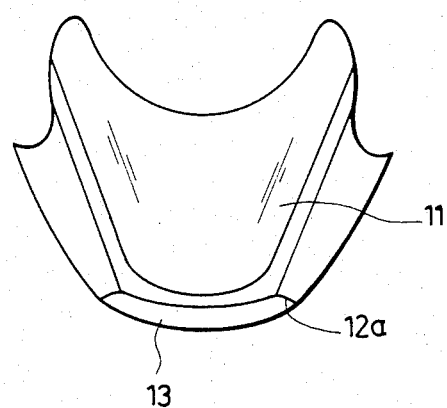
FIG. 2 (*a*) is a schematic top plan view of the headlight device with two lights according to an embodiment of the present invention, which is incorporated in the fairing of a motorcycle.
Figure 2:
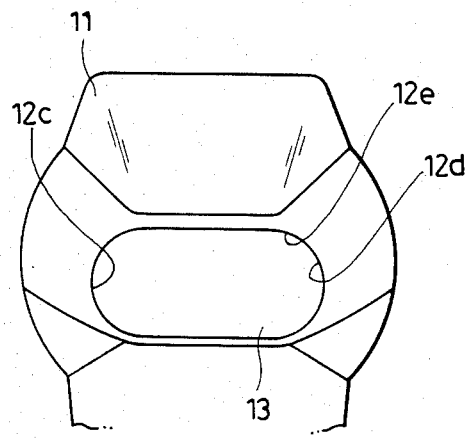
Figure 2:
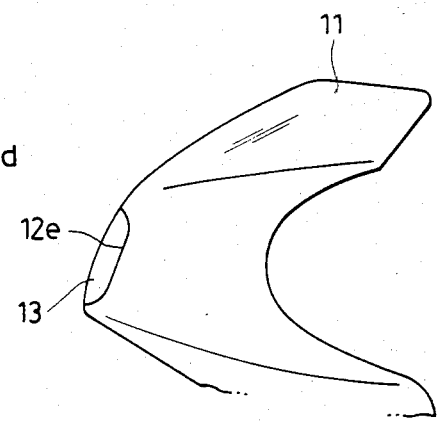

In FIG. 2, a fairing 11 which covers a front portion of a motorcycle, not shown, and reduces the air resistance that the motorcycle undergoes during running has an internal space 12 defined therein and a front opening 12e formed in a forwardly projected front end wall thereof and facing the internal space 12. A headlight device 13 with two lights for motor cycles according to an embodiment of the invention is mounted in the open space 12 through the front opening 12e in such a manner that it is tightly fitted in the front opening 12e of the fairing 11 in one body without any gap formed between the device 13 and the marginal edge of the front opening 12e.

Figure 3:
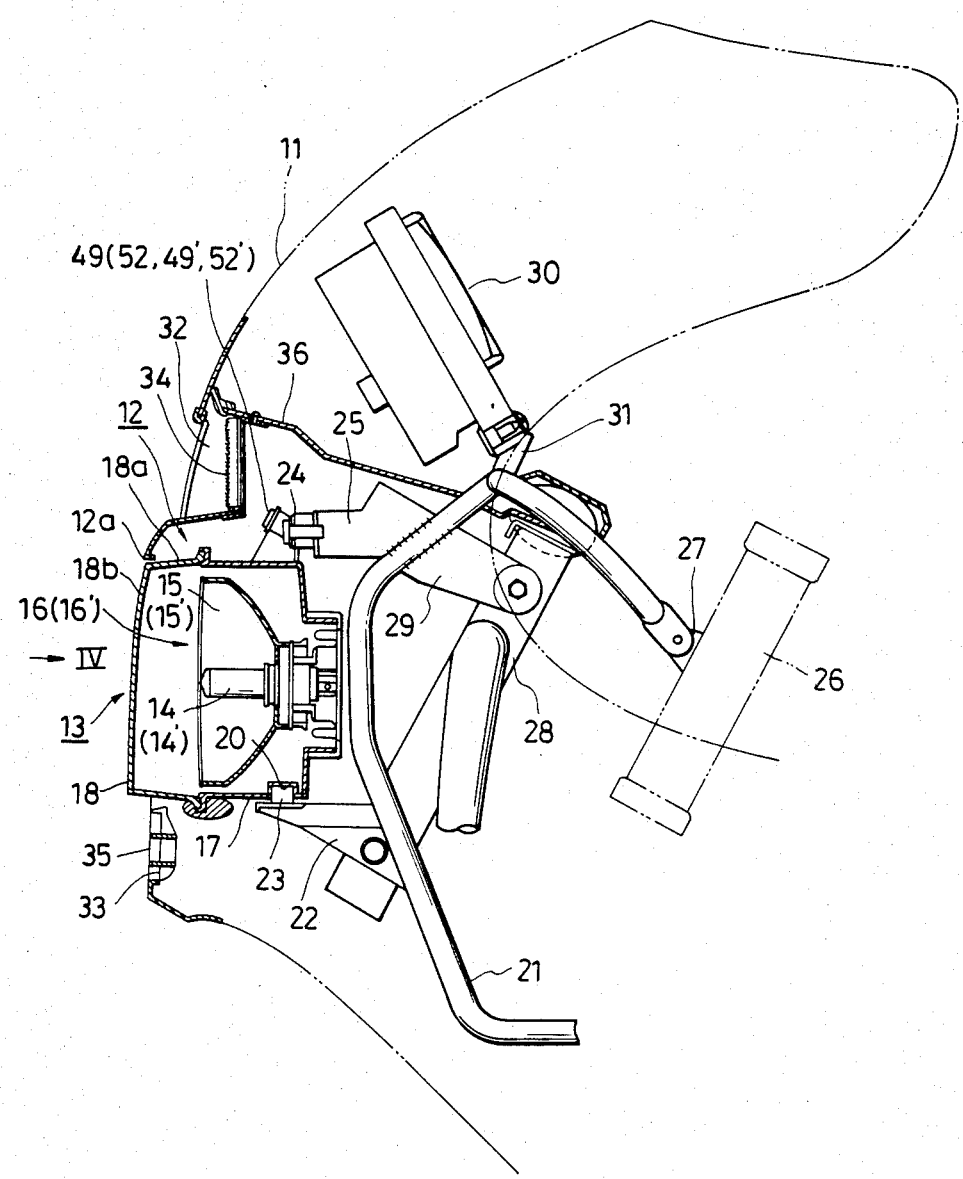
FIG. 3 is a longitudinal sectional view of the headlight device according to the present invention and its peripheral parts.
Figure 4:
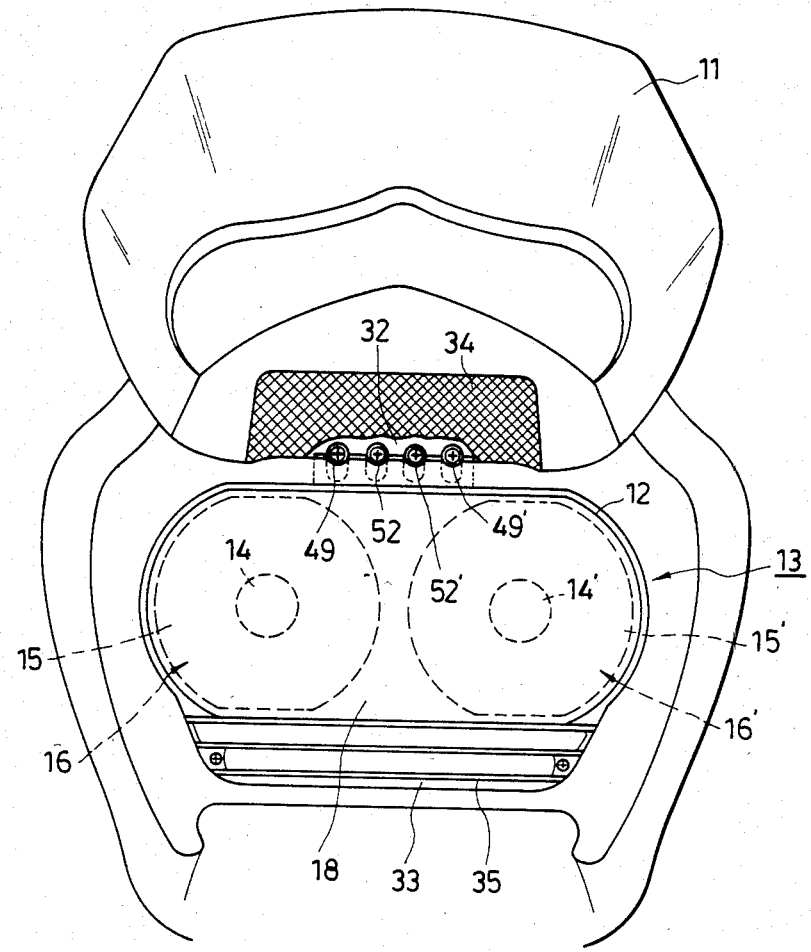
FIG. 4 is a front view as viewed in the direction indicated by the arrow IV in FIG. 3.
Figure 5:
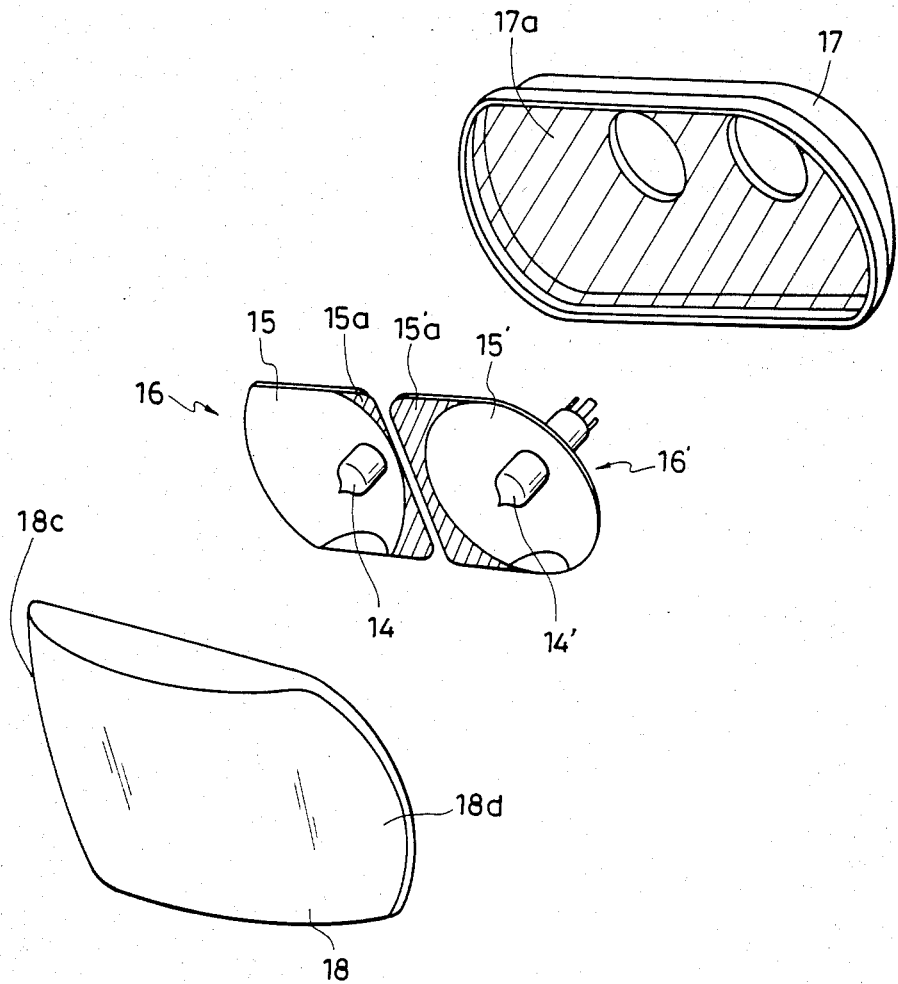
FIG. 5 is an exploded perspective view of part of the headlight device of FIG. 3.

Referring now to FIG. 3 through FIG. 5, the headlight device 13 comprises a pair of light units 16, 16' each formed of a headlight bulb 14, 14', and a reflector 15, 15' disposed behind the light bulb. These light units 16, 16' are accommodated within a single light casing 17 and juxtaposed with each other therein. The light casing 17 is disposed in the open space 12 and supportedly secured to the frame body of the motorcycle, as hereinafter described. The light casing 17 has an open front face 17e covered with a lens element 18 abutting with the marginal edge of the open front face 17e. The light units 16, 16' each have optical axis-adjusting means 19, 19' (in FIG. 7) which are accessible from the outside of the light casing 17 for adjustment of the position of the optical axis, as hereinafter described.

The lens element 18 has a cap-shaped configuration having a forwardly projected central portion, and opposite side edges 18c, 18d' semicircular in shape identical with the shapes of associated edges 12c and 12d of the front opening 12e of the fairing 11 ((b) of FIG. 2) so that the lens element 18 and the fairing 11 in which the lens element 18 is fitted cooperate to present a roundish profile which is excellent aerodynamically. To assure required aerodynamic characteristics, a peripheral wall 18a of the lens element 18 is tightly fitted in the front opening 12e of the fairing 11 along the whole marginal edge thereof, and the front wall has a front surface disposed on substantially the same plane with the the front opening 12e of the fairing 11.

Incidentally, an inner face 17a of the light casing 17 and front side laterally inner faces 15a, 15'a of the reflectors 15, 15' are painted in black as hatched in FIG. 5 to prevent reflection of light from the headlight bulbs 14, 14' by these faces.

As best shown in FIG. 3, the headlight device 13 is fixed to the frame body of the motorcycle by means of a sub frame 21. More specifically, a projection 23 of a stay 22 forwardly extending integrally from the stay 21 is fitted, via an elastic member (not shown), in a recess 20 formed in a lower face of the light casing 17 of the headlight device 13, while on the other hand, a bracket 24 secured on top of the light casing 17 is threadedly engaged with a stay 25 forwardly extending integrally from the sub frame 21, to thereby fixedly mount the headlight device 13 on the frame body, not shown, of the motorcycle. The sub frame 21 is rigidly fixed to the frame body of the motorcycle in a manner that it is screwed at a rear end thereof to a bracket 27 secured to the head tube 26, and at a lower and rear end thereof to a bracket, not shown, secured to a down tube, not shown, of the frame body.

As shown in FIG. 4, a radiator 28 is interposed between the headlight device 13 and the head tube 26 and rigidly fixed to the sub frame 21 in a manner that each side wall thereof has its lower portion screwed to the stay 22, and its upper portion screwed to a stay 29 rearwardly extending integrally from an upper portion of the sub frame 21. A meter unit 30 is arranged above the radiator 28 and fixed to a stay 31 upwardly extending from an upper portion of the sub frame 21.

As best shown in FIG. 4, the fairing 11 is formed with air inlet ports 32 and 33 at locations above and below the headlight device 13, respectively, which are covered with respective upper and lower grilles 34 and 35.

In FIG. 3, reference numeral 36 designates a baffle plate which acts to effectively guide fresh air toward the radiator 28 while it is flowing into the fairing 11 through the air inlet ports 32, 33, so as to impede upward movement of the heat of the radiator 28. The baffle plate 36 also serves to prevent movement of water droplets from the backside of the meter unit 30 to the indicator surface thereof.

Figure 6:
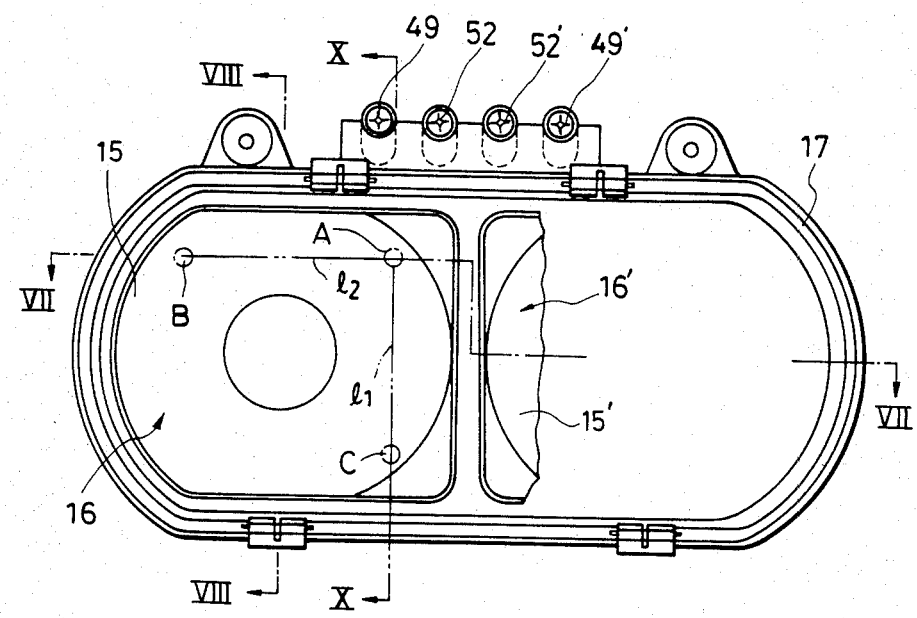
FIG. 6 is a front view of the headlight device of FIG. 3.

The optical axis-adjusting means 19, 19' will now be explained with reference to FIGS. 6 through 10. The left and right light units 16, 16' appearing in FIG. 6 are each adapted to have its optical axis or beam direction adjusted by the respective optical axis-adjusting means 19, 19' which are identical in construction. The following explanation will mainly refer to the optical axis-adjusting means 19 for the the left light unit 16 shown in FIGS. 6 and 7, for the convenience of explanation.

Figure 7:
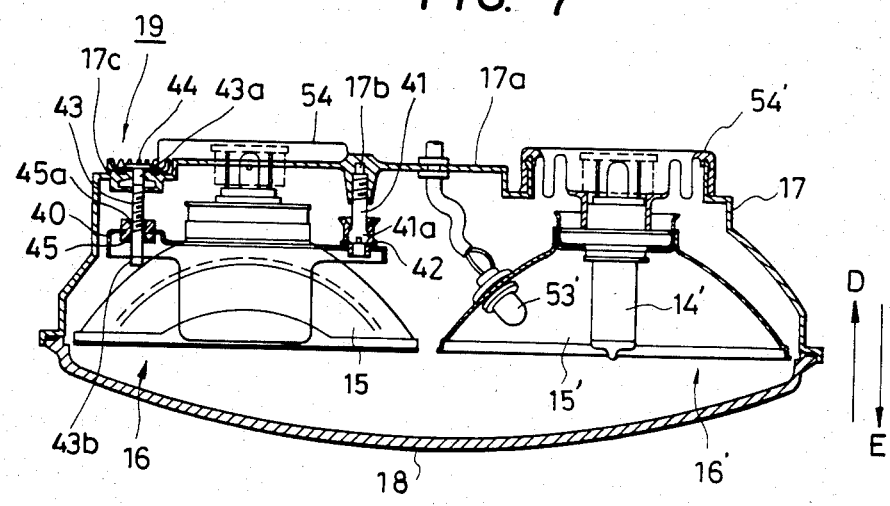
FIG. 7 is a sectional view taken along line VII—VII FIG. 6.

In FIGS. 6 and 7, a bracket 40 is rigidly secured to the backside surface of the reflector 15 to support the latter. The bracket 40 is supported at three points (A), (B), and (C) thereof appearing in FIG. 6 and pivotable about the point (A) to permit adjustment of its angular position in the vertical and horizontal directions in the light casing 17. To be specific, at a first predetermined location, i.e. at a right and upper corner indicated by (A) in FIG. 6, the bracket 40 is supported for pivotal or swivel motion about its fixed fulcrum (A) in all directions, while at second and third predetermined locations or at a left and upper corner and a right and lower corner indicated, respectively, by (B) and (C), it is supported for movement along the optical axis of the light unit 16 indicated by the arrows D and E in FIG. 7 to permit adjustment of the axial position.

Figure 10:
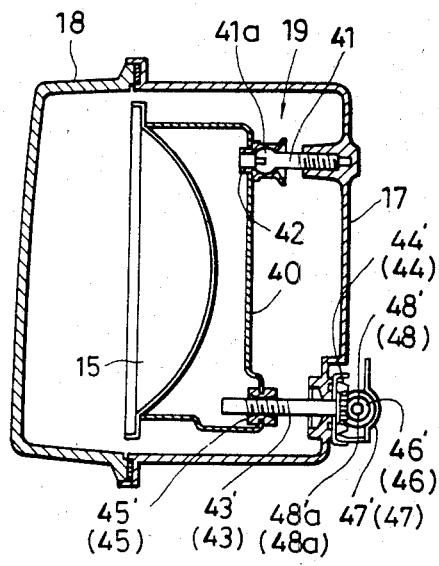
FIG. 10 is a sectional view taken along line X—X in FIG. 6.

First, as regards the support means for supporting the light unit 16 at the first predetermined location (A) thereof, as shown in FIG. 7, an end of a rod 41 is rigidly threadedly fitted in a tapped hole 17b formed in a rear wall 17a of the light casing 17 and extends forwardly from the rear wall 17a of the casing 17. A ball seating member 42 is spherically fitted on an integral ball portion 41a formed at the tip of the rod 41 and is fixed to the bracket 40. Further reference will be made to horizontal position adjusting means for supporting the light unit 16 at the second predetermined location (B) for movement along the optical axis, operating means for operating the same adjusting means, and coupling means for operatively coupling the two means with each other. As shown in FIGS. 7 and 10, a bolt 43 has a rear end portion 43a thereof supported in a bearing 17c formed integrally with the rear wall 17a of the light casing 17, for rotation about its own axis. The tip of the rear end portion 43a of the bolt 43 is projected to the outside through the rear wall 17a of the light casing 17 and provided with a crown gear 44. The other or front end portion 43b of the bolt 43 is threadedly fitted through a nut 45 forming the adjusting means together with the bolt 43 and securedly fitted in the bracket 40. The nut 45 has a tapered tapped hole 45a gradually increasing in diameter toward the opposite open ends so that in adjusting the optical axis position the nut 45 can be smoothly kept in threaded engagement with the bolt 43 even in a state inclined with respect to the latter.

Figure 8:
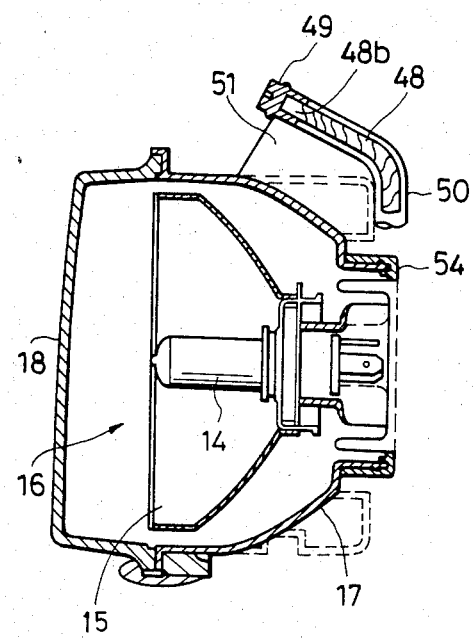
FIG. 8 is a sectional view taken along line VIII—VIII in FIG. 6.

A pinion 46 meshes with the crown gear 44 as shown in FIG. 10 and is rotatably supported by a bracket 47 secured to the light casing 17. One end of a flexible wire cable 48 is coaxially connected to the pinion 46 as shown in FIG. 10, while as shown in FIG. 8, the other end 48b of the wire cable 48 is coaxially connected to a screw 49 as a rotating element. The screw 49 is mounted on the tip of a pipe 50 covering the wire cable 48 fitted therein, for rotation about the pipe 50. The pipe 50 in turn is supportedly secured to a bracket 51 extending from the light casing 17.

Thus, by rotating the screw 49 which is disposed exteriorly of and above the light casing 17 in a given direction, the wire cable 48 is forced to rotate about its own axis within the pipe 50 to cause rotation of the pinion 46 in a given direction. The rotation of the pinion 46 causes corresponding rotation of the crown gear 44 meshing therewith and accordingly that of the bolt 43 integral with the crown gear 44 to displace the nut 45 in the direction indicated by the arrow D or E in FIG. 7. Consequently, the bracket 40 integral with the nut 45 and accordingly the light unit 16 are rotated about the vertical line 11 connecting the first and third predetermined locations A, C in the horizontal direction. In this manner, adjustment of the optical axis position of the light unit 16 in the horizontal directions thereof is effected.

On the other hand, the vertical adjusting means, the operating means and the coupling means, which engage with the bracket 40 at the third predetermined location C are identical in construction with the horizontal adjusting means, etc. just described above except for the adjusting direction of the optical axis. That is, by rotating a screw 52 which is in the second place from the left side as viewed in FIG. 6, a bolt 43' is rotated through a wire cable 48', a pinion 46', and a crown gear 44' to move a nut 45' in the direction indicated by the arrow D or E in FIG. 10. Consequently, the bracket 40 integral with the nut 45' and accordingly the light unit 16 are rotated about the horizontal line 2 connecting the first and second predetermined locations A, B in the vertical direction, thereby effecting adjustment of the optical axis position of the light unit 16 in the vertical directions thereof. In FIG. 7, reference numeral 53' designates a bulb for position light, and reference numerals 54 and 54' designate rubber covers, illustration of which is omitted in FIGS. 3-5. To rotate the screws 49, 52 disposed within the open space 12 in the fairing 11, a screw driver may be inserted into the open space 12 through the air guide hole 32 (in FIG. 3) formed in the fairing 11 to rotate the screws 49, 52.

Figure 9:
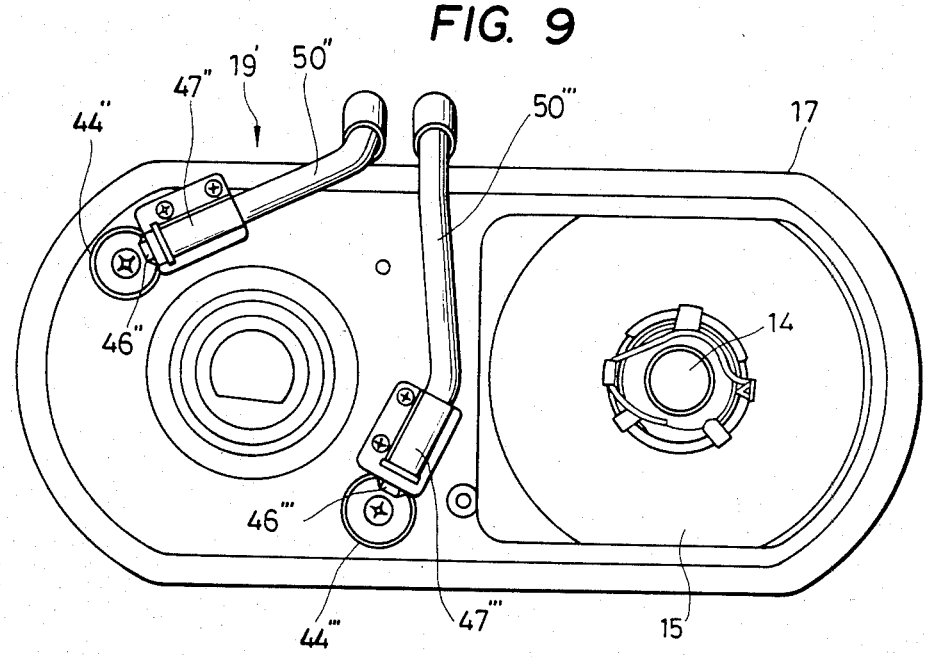
FIG. 9 is a rear view of the headlight device of FIG. 3.

The optical axis-adjusting means 19' of the light unit 16' on the right side are constructed in substantially the same manner with the above described means 19. That is, as shown in FIG. 6, a screw 49' for horizontal adjustment of the optical axis position and a screw 52' for vertical adjustment of same are arranged on an outer peripheral surface of the light casing 17 facing in the forward or beam-emitted direction of the casing, in a concentrated manner together with the aforedescribed screwed 49, 52. In FIG. 9 are shown coupling means for the horizontal adjusting means of the light unit 16', that is, a crown gear 44'', a pinion 46'', a bracket 47'', a wire cable-covering pipe 50'', and similar elements 44''', 46''', 47''', and 50''' for the vertical adjusting means of the light unit 16'.

Although in the above described embodiment the invention has been applied to a headlight device for a motorcycle, this is not limitative, but the invention may be applied to headlight devices for motor tricycles and those for motorcars.

Although in the foregoing embodiment the outer peripheral surface of the lens element 18 is fitted in the marginal edge 12a of the front opening 12e of the fairing 11, the light casing 17 may alternatively have an outer peripheral surface thereof fitted in the same marginal edge 12a, while the lens element 18 mounted in the front face of the light casing 17 may be disposed in the front opening 12e on substantially the same plane as the marginal edge 12e.

Alternatively of mounting the headlight device on the frame body of the motorcycle via the stays 21, 25 as in the illustrated embodiment, the device may be rigidly mounted on the fairing 11.

The optical axis-adjusting means 19, 19' are not limited to that of the foregoing embodiment wherein they are manually operated, but a motorized mechanism using an electric motor may be employed for the optical axis-adjusting means insofar as the light units 16, 16' are accessible from the outside of the light casing 17 for adjustment of the optical axis position.

Various results obtainable with the headlight device with two lights according to the invention can be summarized as follows:

(i) Since a pair of light units 16, 16' are accommodated within a single stationary casing 17, and a lens element 18 is mounted in a front face of the casing 17, the headlight device with two lights can be incorporated in the fairing 11 without gaps between them, thereby improving the aerodynamic characteristics of the fairing 11;

(ii) The arrangement that the optical axis adjustment of each of the light units 16, 16' can be performed from the outside of the light casing 17 while maintaining the casing 17 stationary in place, facilitates easy and accurate optical axis adjustment even after the headlight device has been mounted into the fairing 11;

(iii) The arrangement of all the operating elements of the optical axis-adjusting means on the beam emitting side of the light units facilitates manual operation of the adjusting means and improves the appearance;

(iv) Since the mounting of the headlight device onto the frame body of an automotive vehicle and the optical axis adjustment of the light units can be effected independently of each other, the former operation can be carried out with ease;

(v) Since the couping means for operatively connecting the adjusting means with the operating element is formed of a gear mechanism and flexible shaft means connecting the gear mechanism with the operating element, the use of the flexible shaft means can afford large fabricating or machining tolerances and assembling tolerances, facilitating the assemblage of the headlight device and also permitting arrangement of the operating element at any desired location.

What is claimed is:

1. A headlight device for a motorcycle having a fairing covering a front portion of said motorcycle, said fairing having an internal space defined therein and a front opening facing said internal space, comprising:
- a pair of light units each having a light bulb, and a reflector disposed behind said light bulb;
- a single light casing disposed in said internal space of said fairing and having an open front face and an outer peripheral surface, said pair of light units being accommodated within said light casing and juxtaposed with each other therein;
- lens means arranged at said open front face of said light casing and having an outer peripheral surface;
- at least one of said outer peripheral surface of said light casing and said outer peripheral surface of said lens means being tightly fitted in said front opening of said fairing along the whole periphery thereof.

2. A headlight device as claimed in claim 1, including mounting means for mounting said light casing stationarily in a predetermined place, and optical axis-adjusting means for causing angular displacement of each of said light units in first and second predetermined directions for adjustment of the position of an optical axis of said each of said light units, in a manner independent of said mounting means, said optical axis-adjusting means being disposed at a location accessible for operation thereof from the outside of said light casing.

3. A headlight device as claimed in claim 2, wherein said optical axis-adjusting means comprises a pair of adjusting means each of which comprises support means supporting a corresponding one of said light units for swivel motion about a first predetermined location thereof in all directions, first adjusting means engaging said corresponding one of said light units at a second predetermined location thereof and supporting same for movement along the optical axis of said light bulb thereof, said first adjusting means being disposed at a location accessible from the outside of said light casing to be operated in a manner causing displacement of said corresponding one of said light units along the optical axis and angular displacement thereof in said first predetermined direction about said first predetermined location, and second adjusting means engaging said corresponding one of said light units at a third predetermined location thereof and supporting same for movement along the optical axis, said second adjusting means being disposed at a location accessible from the outside of said light casing to be operated in a manner causing displacement of said corresponding one of said light units along the optical axis and angular displacement thereof in said second predetermined direction about said first predetermined location.

4. A headlight device as claimed in claim 3, wherein each of said light units includes a bracket fixed to said each of said light units and disposed behind said reflector thereof, said light casing having a rear wall, said support means of said each of said light units including a shaft element extending from said rear wall of said light casing and having one end fitted in said bracket at said first predetermined location thereof for swivel motion thereabout, said first and second adjusting means including first and second nut elements secured to said bracket at respective ones of said second and third predetermined locations of said each of said light units, and first and second bolt elements each having one end portion extending through said rear wall of said light casing and outwardly therefrom and another end portion threadedly fitted in a respective one of said first and second nut elements.

5. A headlight device as claimed in claim 4, wherein said first, second and third predetermined locations are situated at a peripheral edge portion of said bracket, said first and second predetermined locations being disposed on the same horizontal line, said first and third predetermined locations being disposed on the same vertical line, each of said light units being rotatable in a vertical direction and a horizontal direction which are said first predetermined direction and said second predetermined direction, respectively.

6. A headlight device as claimed in claim 3, including first and second operating elements for operating said first and second adjusting means of said optical axis-adjusting means, respectively, said first and second operating elements being arranged on a beam emission side of said corresponding one of said light units in a concentrated manner, and coupling means operatively coupling said first and second adjusting means with respective ones of said first and second operating elements.

7. A headlight device as claimed in claim 4, including first and second rotary operating elements for rotatively operating said first and second bolt elements of said optical axis-adjusting means, respectively, said first and second rotary operating elements being arranged on a beam emission side of said corresponding one of said light units in a concentrated manner, and coupling means operatively coupling said first and second bolt elements with respective ones of said rotary operating elements, said coupling means comprising gear means provided on each of said first and second bolt elements, and flexible shaft means operatively coupling said gear means with a corresponding one of said first and second rotary operating elements.

8. A headlight device as claimed in claim 1, wherein said lens means has a front wall and a peripheral wall forming said outer peripheral surface thereof, said peripheral wall of said lens means being tightly fitted in said front opening of said fairing along a whole periphery thereof, said front wall of said lens means having a front surface disposed on substantially the same plane with said front opening of said fairing.

9. A headlight device as claimed in claim 4, wherein each of said first and second nut elements has a tapped hole and opposite open ends, said tapped hole gradually increasing in diameter toward said opposite open ends.

10. A headlight device as claimed in claim 6 or claim 7, wherein all said operating elements are mounted on said light casing.

* * * * *